United States Patent Office 3,106,447
Patented Oct. 8, 1963

3,106,447
RECOVERING MAGNESIUM-ALUMINUM SPINEL FROM FERRO-CHROMIUM SLAG
Fedia R. Charvat, Williamsville, N.Y., assignor to Union Carbide Corporation, a corporation of New York
No Drawing. Filed Nov. 7, 1961, Ser. No. 150,652
5 Claims. (Cl. 23—52)

The present invention relates to the beneficiation of slag derived in the production of high carbon ferrochromium. More particularly, the present invention relates to the production of a magnesium-aluminum spinel-containing phase from high carbon ferrochromium slag, the product spinel-containing phase being substantially free from silica and metallic impurities.

Slag as derived from the industrial production of high carbon ferrochromium contains the following materials in about the proportions indicated:

|  | Percent |
|---|---|
| Magnesium oxide (MgO) | 25 to 40 |
| Aluminum oxide ($Al_2O_3$) | 25 to 40 |
| $Cr_2O_3$ | <5 |
| $Fe_2O_3$ | <5 |
| CaO | <3 |
| Fe | <3 |
| $SiO_2$ | 20 to 40 |

It will be noted that the quantities of alumina and magnesia in such slags are high enough to give rise to the possibility of utilizing the slags for the preparation of magnesium-aluminum spinel, a refractory used in the manufacture of brick for lining open hearth steel-making furnaces. Unfortunately, however, the slag contains so much silica that it is unsuitable for manufacture directly into brick for open hearth furnaces.

If the aluminum oxide and magnesium oxide contained in the slag could be combined as spinel and effectively separated from the silica, the spinel could then be utilized directly in the production of refractory bricks. At the same time the slag, which ordinarily constitutes an economically significant disposal problem, would be converted into a commercial asset.

It is therefore an object of the present invention to beneficiate high carbon ferrochromium slag by separating the contained silica therefrom and recovering the contained magnesium and aluminum oxides.

It is another object of the present invention to recover magnesium oxide and aluminum oxide from high carbon ferrochromium slag in the form of a spinel phase substantially free from metallic impurities.

Other objects will be apparent from the following description and claims.

A process in accordance with the present invention comprises mixing high carbon ferrochromium slag with iron and carbon and sufficient aluminum oxide and magnesium oxide, measured as MgO and $Al_2O_3$, to provide a reaction mixture having a magnesium oxide to aluminum oxide ratio, by weight, of between about 0.67 and 1.1 and having a CaO content of less than 3 percent, the carbon in the mixture being in at least the amount sufficient to completely reduce all silica contained in the reaction mixture upon the heating of the reaction mixture to an elevated temperature and the iron in the reaction mixture being in an amount sufficient to combine with all silicon and carbon-reducible metallic impurities contained in the reaction mixture to provide a ferrosilicon material containing at least about 75 percent iron; heating the reaction mixture to a temperature at which the reaction mixture is in a condition intermediate its solidus and liquidus states; maintaining the reaction mixture in this intermediate condition until substantially all of the silica in the reaction mixture has been reduced and until the mixture is substantially free from uncombined carbon; subsequently increasing the temperature to a value at which the mixture is in the liquidus state to thereby coagulate the metallic material in the mixture and provide distinct metallic and non-metallic phases; and separating the non-metallic phase from the mixture.

In accordance with the present invention, slag resulting from the production of high carbon ferrochromium is finely divided, e.g. to less than about 8 mesh, and admixed with finely divided carbon, also conveniently particulated to less than 8 mesh. The mixture is introduced into a furnace such as an electric furnace of the carbon electrode submerged arc type. Iron in the form of scrap is added to the mixture which is heated to a temperature at which the reaction mixture of slag, carbon and iron is in a condition intermediate the solidus and liquidus states. When the reaction mixture is in this condition the carbon vigorously reacts with and reduces the silica and any contained chromium and iron oxidic material in the slag. As a result of the heat treatment and the resultant reduction reaction, the mixture is converted into a non-metallic phase of aluminum oxide and magnesium oxide and a metallic phase of ferrosilicon containing minor quantities of chromium with substantially all of the carbon in the reaction mixture being oxidized or combined in the metallic phase.

After substantial completion of the reduction of silica in the mixture and when the mixture is substantially free from uncombined carbon, as evidenced by cessation of agitation, the temperature of the mixture is increased to a value at which it becomes completely molten. Under these circumstances, the metallic phase, i.e. the chromium-containing ferrosilicon, coagulates and assumes a position in the lower portion of the furnace separate from and below the non-metallic magnesium-aluminum spinel-containing phase. When the upper and lower phase separation has been achieved, the spinel-containing material is recovered, for example by pouring off the non-metallic phase or by solidifying the entire molten bath and subsequently particulating the mass and separating the non-metallic solid particles from the metallic particles by conventional techniques such as magnetic separation.

In the process of the present invention it is required that the reaction mixture have a magnesium oxide to aluminum oxide ratio, by weight, of between 0.67 and 1.1, the magnesium oxide and aluminum oxide being measured as MgO and $Al_2O_3$ respectively.

With lesser proportions of magnesium oxide in the mixture, increasingly higher temperatures are required in order to provide a condition above the solidus state of the mixture at which the carbon will effectively react with the silica. At these higher temperatures, a substantial and increasingly more rapid loss of magnesium oxide occurs as the reduction reaction proceeds.

When higher proportions of magnesium oxide than those specified are employed, a very rapid and substantial loss of this material occurs when the mixture is in a condition above its solidus state. On the other hand, it has been found that, when the specified proportions of magnesium oxide and aluminum oxide are provided, temperatures between about 1850° C. and 1900° C. will provide a condition in the mixture intermediate the solidus and liquidus states under which circumstances the carbon effectively reduces the silica contained in the slag while the loss of magnesium oxide from the reaction mixture is negligible. The required proportion of magnesium oxide to aluminum oxide in the mixture, if not already present by virtue of the slag composition, can be adjusted by adding additional amounts of these materials to the mixture.

In addition to having a particular magnesium oxide to aluminum oxide ratio as specified herein, it is also necessary that the CaO content of the mixture be less than about 3 percent in order that the magnesium-aluminum spinel-containing material which is produced in the process will have satisfactory refractory properties for use as a constituent in refractory bricks for open hearth furnace construction. If the available slag contains excessive CaO, the proportion thereof in the reaction mixture can be reduced by addition of magnesium oxide and aluminum oxide in suitable amounts.

With regard to the carbon in the reaction mixture, in order to provide a spinel-containing product substantially free from silica and metal impurities, at least sufficient carbon is provided to completely reduce the silica in the reaction mixture during the heat treatment thereof. That is, at least the stoichiometric amount of carbon is provided for reducing the minor amounts of iron and chromium oxidic materials contained in the slag in addition to the silica. The carbon in the mixture can be added to the mixture as coke or in other convenient form.

The iron in the reaction mixture, which is conveniently in the form of scrap, is in an amount sufficient to provide, upon combination with the silicon and the reduced metals, a ferrosilicon material having at least 75 percent iron. By providing this amount of iron in the mixture, sufficient solute is provided for collecting the reduced metals in the reaction mixture into a separate metallic phase. Additionally, this amount of iron provides a metallic phase which can be conveniently separated from the non-metallic spinel-containing phase by magnetic techniques.

With regard to the operating temperatures of the process of the present invention, the reaction mixture is initially heated to between about 1850° C. and 1900° C. to provide a condition intermediate the solidus and liquidus states under which circumstances the carbon in the mixture effectively reduces the silica and chromium and iron oxidic material while the magnesium oxide and aluminum oxide in the mixture are substantially unaffected.

After completion of the carbon-silica reaction and when the mixture is substantially free from uncombined carbon, the temperature of the mixture is raised until it is in the liquidus state, i.e. above about 2050° C. to coagulate the reduced metallic materials in a ferrosilicon phase which then settles toward the lower portion of the furnace. The non-metallic materials form a spinel-containing phase substantially free from silicon and other metal impurities which floats above the ferrosilicon phase.

The portion of the non-metallic phase which is closely adjacent to the metallic phase may at times contain undesired amounts of metal or other material. In such a case, to obtain optimum spinel recovery, this portion of the non-metallic phase is not decanted, but is solidified with the metallic phase and particulated. The undesired materials are ultimately removed by conventional separation techniques.

Under some circumstantes it may be more effective or more desirable to solidify the entire molten mixture, after coagulation of the metal phase, subsequently particulating and magnetically separating the metallic material from the non-metallic spinel. The particulated spinel thus obtained can be used directly in the manufacture of fused grain type refractory bricks.

The following example is provided to illustrate the present invention:

*Example I*

High carbon ferrochrome slag in the amount of 4.9 pounds is crushed to minus 8 mesh and mixed with 0.83 pound of minus 8 mesh carbon granules. The mixture is charged to a graphite crucible together with 3.3 pounds of essentially pure iron plate. The composition of the slag is as follows:

| | Percent |
|---|---|
| $SiO_2$ | 33.3 |
| Magnesium oxide (Mgo) | 32.9 |
| Aluminum oxide ($Al_2O_3$) | 27.0 |
| CaO | 2.0 |
| $Cr_2O_3$ | 1.7 |
| FeCr | 2.3 |

The crucible and charge are heated by induction to about 1850° C. and maintained at this temperature for about one hour until gas evolution has practically ceased. During this initial heating period the material in the crucible is in a condition intermediate the solidus and liquidus states.

Following the above heating step, the temperature increased to about 2050° C., at which temperature the material in the crucible becomes molten and a metallic phase coagulates and settles at the bottom of the crucible below a non-metallic phase.

The charge is solidified by cooling and crushed to about 20 mesh after which the metallic and non-metallic fractions are magnetically separated.

X-ray diffraction of the non-metallic material shows a strong spinel pattern plus faint periclase lines. The metallic material is shown by X-ray studies to be a solid solution of iron and silicon.

Chemical analysis shows 9.9 percent silicon in the metallic phase and less than about 4.6 percent silica in the non-metallic phase.

In the practice of the present invention as above described, the non-metallic material produced is predominantly magnesium-aluminum spinel, i.e. $MgO \cdot Al_2O_3$, although magnesium oxide or aluminum oxide may be separately present in the non-metallic product material depending upon the disproportion of magnesium oxide to aluminum oxide in the reaction mixture. However, for the disproportion of magnesium oxide to aluminum oxide which is permitted in the process of the present invention, i.e. 0.67 to 1.1, the product obtained is highly suitable for the manufacture of refractory bricks for use in open-hearth furnaces.

In a further embodiment of the present invention, the preferred weight ratio of magnesium oxide to aluminum oxide is approximately 0.79. When this ratio is provided the preferred operating temperatures are 1850° C. for establishing a condition intermediate the solidus and liquidus states of the reaction mixture, and 2050° C. for coagulating the metallic phase. Under these operating conditions, optimum process economy is achieved with negligible loss of magnesium oxide and a very high quality spinel product is recovered.

The magnesium-aluminum spinel-containing material derived from the above-described embodiments of the present invention can be used directly in the casting of refractory bricks. Alternatively, the solidified spinel-containing material, in particulated form, can be pressed and sintered in accordance with conventional techniques to provide fused grain refractory bricks.

From the previous disclosure it can be seen that a novel process is provided for beneficiating high carbon ferrochromium slag whereby a magnesium-aluminum spinel-containing material is obtained which can be directly used in the manufacture of refractory bricks while at the same time the silicon values in the slag are recovered in the form of ferrosilicon.

What is claimed is:

1. A process for beneficiating high carbon ferrochromium slag by removing silica and recovering magnesium-aluminum spinel-containing material therefrom substantially free from metallic impurities, said process comprising mixing high carbon ferrochromium slag with iron and carbon and sufficient aluminum oxide and magnesium oxide to provide a reaction mixture having a magnesium oxide to aluminum oxide ratio, by weight, measured as MgO and Al$_2$O$_3$, of between about 0.67 and 1.1 and having a CaO content of less than 3 per cent, the carbon in the mixture being in at least the amount sufficient to completely reduce all silica contained in the reaction mixture upon the heating of the reaction mixture to an elevated temperature and the iron in the reaction mixture being in an amount sufficient to combine with all silicon and carbon-reducible metallic impurities contained in the reaction mixture to provide a ferrosilicon material containing at least about 75 percent iron; heating the reaction mixture to a temperature at which the reaction mixture is in a condition intermediate its solidus and liquidus states; maintaining the reaction mixture in this intermediate condition until substantially all of the silica in the reaction mixture has been reduced and until the mixture is substantially free from uncombined carbon; subsequently increasing the temperature to a value at which the mixture is in the liquidus state to thereby coagulate the metallic material in the mixture and provide distinct metallic and non-metallic phases; and separating the non-metallic spinel phase from the mixture.

2. A process in accordance with claim 1 wherein the non-metallic spinel phase is separated from the mixture by decanting.

3. A process in accordance with claim 1 wherein the liquidus mixture containing distinct metallic and non-metallic phases is cooled and solidified, the solid mass being subsequently particulated into finely divided form and the metallic phase being magnetically removed from the finely divided spinel material.

4. A process for beneficiating high carbon ferrochromium slag by removing silica and recovering magnesium-aluminum spinel-containing material therefrom substantially free from metallic impurities, said process comprising mixing high carbon ferrochromium slag with iron and carbon and sufficient aluminum oxide and magnesium oxide to provide a reaction mixture having a magnesium oxide to aluminum oxide ratio, by weight, measured as MgO and Al$_2$O$_3$, of between about 0.67 and 1.1 and having a CaO content of less than 3 percent, the carbon in the mixture being in at least the amount sufficient to completely reduce all silica contained in the reaction mixture upon the heating of the reaction mixture to an elevated temperature and the iron in the reaction mixture being in an amount sufficient to combine with all silicon and carbon-reducible metallic impurities contained in the reaction mixture to provide a ferrosilicon material containing at least about 75 percent iron; heating the reaction mixture to between 1850° C. and 1900° C.; maintaining the reaction mixture in this temperature range until substantially all of the silica in the reaction mixture has been reduced and until the mixture is substantially free from uncombined carbon; subsequently increasing the temperature to above about 2050° C. to provide distinct metallic and non-metallic phases; and separating the non-metallic spinel phase from the mixture.

5. A process for beneficating high carbon ferrochromium slag by removing silica and recovering magnesium-aluminum spinel therefrom substantially free from metallic impurities, said process comprising mixing high carbon ferrochromium slag with iron and carbon and sufficient aluminum oxide and magnesium oxide to provide a reaction mixture having a magnesium oxide to aluminum oxide ratio, by weight, measured as MgO and Al$_2$O$_3$, of 0.79 and having a CaO content of less than 3 percent, the carbon in the mixture being in at least the amount sufficient to completely reduce all silica contained in the reaction mixture upon the heating of the reaction mixture to an elevated temperature and the iron in the reaction mixture being in an amount sufficient to combine with all silicon and carbon-reducible metallic impurities contained in the reaction mixture to provide a ferrosilicon material containing at least about 75 percent iron; heating the reaction mixture to about 1850° C. at which temperature the reaction mixture is in a condition intermediate its solidus and liquidus states; maintaining the mixture at this temperature until substantially all of the silica in the reaction mixture has been reduced and until the mixture is substantially free from uncombined carbon; subsequently increasing the temperature to about 2050° C. to provide distinct metallic and non-metallic phases; and separating the non-metallic spinel phase from the mixture.

References Cited in the file of this patent

UNITED STATES PATENTS

| | | |
|---|---|---|
| 1,001,497 | Allen | Aug. 22, 1911 |
| 1,448,010 | Tone | Mar. 13, 1923 |
| 2,934,422 | Udy | Apr. 26, 1960 |